(12) United States Patent
Seok

(10) Patent No.: US 6,669,882 B2
(45) Date of Patent: Dec. 30, 2003

(54) PROCESS OF MAKING FIBER HAVING FUNCTIONAL MINERAL POWDER

(76) Inventor: Mi Soo Seok, 101-402, Daea Apt., Gongleung-dong, Nowon-ku, Seoul (KR)

(*) Notice: Subject to any disclaimer, the term of this patent is extended or adjusted under 35 U.S.C. 154(b) by 291 days.

(21) Appl. No.: 09/825,593

(22) Filed: Apr. 4, 2001

(65) Prior Publication Data

US 2002/0014716 A1 Feb. 7, 2002

(30) Foreign Application Priority Data

Apr. 4, 2000 (KR) .......................................... 2000-17775
Jun. 7, 2000 (KR) .......................................... 2000-31236
Feb. 16, 2001 (KR) .......................................... 2001-7699

(51) Int. Cl.$^7$ .................. B01D 21/00; B03C 1/30; B29B 15/00; D01D 1/02; D01F 1/10
(52) U.S. Cl. .................. 264/140; 210/695; 210/787; 210/800; 264/169; 264/211; 264/349
(58) Field of Search .................. 264/140, 169, 264/211, 349; 210/695, 787, 800

(56) References Cited

FOREIGN PATENT DOCUMENTS

JP            57072817 A    *    5/1982           264/211

* cited by examiner

Primary Examiner—Leo B. Tentoni
(74) Attorney, Agent, or Firm—Schmeiser, Olsen & Watts

(57) ABSTRACT

A method of producing fiber having functional mineral powders includes the steps of a first pulverizing functional mineral which crystal form of is pinacoid, a second closely pulverizing the first pulverized functional mineral powders to be less than ⅓ granularity of desired fineness, mixing and synthesizing 0.1–10 weight % of the second pulverized functional mineral powders and 90–99.9 weight % of a chemical resin, and spinning the mixture of functional mineral powders and the chemical resin.

26 Claims, 4 Drawing Sheets

(a)
pinacoid (b)
prism (c)
rhombohedron (d)
hexahedron (e)
octahedron (f)
dodecahedron

PROCESS OF MAKING FIBER HAVING FUNCTIONAL MINERAL POWDER

BACKGROUND OF THE INVENTION

This invention relates to a method of producing fiber having mineral powder, more particularly, to a method of producing fiber having functional mineral powders which crystal forms (cleavage forms) are pinacoid or having two kinds functional mineral powders which a first crystal forms are pinacoid and a second crystal forms are prism, pyramid, rhombohedron, hexahedron (cube), octahedron, or dodecahedron, and a fiber produced therefrom.

Recently, the functional minerals such as elvan, hornblende, rutile, zeolite, zircon, mullite, jade, or tourmaline or artificial synthesized functional minerals therefrom being used in the fiber world.

The functional minerals function as far infrared ray radiating, antibiosis, stench cleaning, electron wave isolating, ultraviolet rays isolating, absorbent, moisture absorption, minus ion radiating, static electricity preventing.

General method of producing fiber having mineral powders is executed through spinning, draft, combustion, cutting, or weaving after simply mixing and synthesizing mineral powders with a chemical resin.

In conventional fiber producing method, however, each crystal form of used functional mineral powders may be various such as prism, pyramid, rhombohedron, hexahedron, octahedron, or dodecahedron thereby wearing fittings of equipments such as a heald, a roller, and a guide body. Furthermore, it is not possible to gain a fiber having smooth surface due to inherent particle structure as the foregoing of the functional mineral powders and the fiber is cut often.

SUMMARY OF THE INVENTION

It is an object of the present invention to provide a method of producing a fiber having functional mineral powders, especially phyllosilicates mineral powders, functioning as far infrared ray radiating, blood pressure controlling, ache relief, antibiosis, stench cleaning, electron wave isolating, ultraviolet rays isolating, absorbent, moisture absorption, minus ion radiating, and static electricity preventing, in which the crystal form of the functional mineral powders are pinacoid.

It is another object of the present invention to provide a method of producing a fiber having mixed functional mineral powders including both of phyllosilicates mineral powder and special mineral powder functioning as far infrared ray radiating, blood pressure controlling, ache relief, antibiosis, stench cleaning, electron wave isolating, ultraviolet rays isolating, absorbent, moisture absorption, minus ion radiating, and static electricity preventing, in which crystal forms of the mineral powders are a pinacoid, prism, pyramid, rhombohedron, hexahedron, octahedron, or dodecahedron.

It is still another object of the present invention to produce a fiber by using the above methods so that the surface of the fiber becomes smooth because particles of the phyllosilicates mineral powders are distributed on the surface, and the productivity is increased because fittings of the equipments such as a heald, a roller, a guide body are not worn.

In order to achieve the above objects, one method of producing a fiber having the functional mineral powders according to the present invention comprises the steps of a first pulverizing the functional mineral which the crystal form of is pinacoid; a second closely pulverizing the first pulverized functional mineral powders to be less than ⅓ granularity of desired fineness; mixing and synthesizing 0.1–10 weight % of the second pulverized functional mineral powders and 90–99.9 weight % of a chemical resin; and spinning the mixture of the functional mineral powders and the chemical resin.

Another method of producing a fiber having the functional mineral powders according to the present invention comprises the steps of a first pulverizing first and second functional minerals which the crystal form of the first functional mineral is pinacoid and the crystal form of the second functional mineral powder is prism, pyramid, rhombohedron, hexahedron, octahedron, or dodecahedron; a second closely pulverizing the first and second pulverized functional mineral powders to be less than ⅓ granularity of desired fineness; mixing the first and second functional mineral powders; mixing and synthesizing the second mixed 0.1–10 weight % of the first and second functional mineral powders and 90–99.9 weight % of a chemical resin; and spinning the mixture of the first and second functional mineral powders and the chemical resin.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiment of the present invention, example of which is illustrated in the accompanying drawings.

Figure 1:
FIGS. 1(a)–1(f) are drawings showing various crystal forms of the mineral.
Figure 1:
Figure 1:
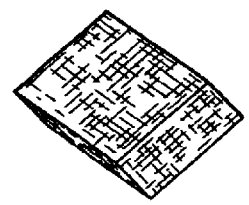
Figure 1:
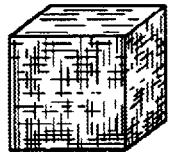
Figure 1:
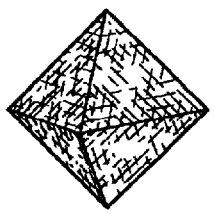
Figure 1:
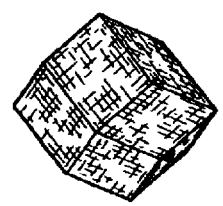

FIG. 1 is a drawing showing various the crystal form of the mineral.

Referring to FIG. 1, (a) represents pinacoid crystal form, (b) represents prism crystal form, (c) represents rhombohedron crystal form, (d) represents hexahedron crystal form, (e) represents octahedron crystal form, and (f) represents dodecahedron crystal form.

A detailed description of crystal forms of the mineral as the foregoing is explained.

(a) pinacoid crystal form: chalcocite, pyrrhotite, marcasite, polybasite, chrysoberyl, ilmenite, brookite, columbite, euxenite, samarskite, gibbsite, brucite, diaspore, boehmite, hydromagnesite, polyhalite, chloritoid, chondrodite, sphene (titanite), melilite, hemimorphite, allanite), pumpellyite, hedenbergite, bronzite, hypersthene, wollastonite, rhodonite, pyrophyllite, talc, paragonite, margarite, prehnite, muscovite, phlogopite, biotite, lepidolite, zinnwaldite, beidellite, montmorillonite, nontronite, saponite, vermiculite, penninite, clinochlore, prochlorite, thuringite, kaolinite, antigorite, amesite, cronstedtite, halloysite, sanidine, heulandite, stilbite, phillipsite, and so on.

(b) prism crystal form: dyscrasite, corundum, rutile, manganite, azurite, malachite, feldspar, kernite, glauberite, monazite, tantalite, colemanite, brochantite, triphylite, apatite, turquoise, phenakite, willemite, zircon, andalusite, kyanite, topaz, staurolite, datolite, gadolinite, thortveitite, lawsonite, ilvaite, clinozoisite, pigeonite, diopside, augite, spodumene, aegirine, aegirine augite, enstatite, tremolite, common hornblend, glaucophane, riebeckite, arfvedsonite, anthophyllite, nepheline, anorthoclase, orthoclase, microcline, albite, cancrinite, marialite, dipyre, mizzonite, meionite, thomsonite, laumontite, mordenite, mellite, flagstaffite, elvan, hornblend, tourmaline, mullite, jade, tourmaline, and so on.

(c) rhombohedron crystal form: calcite, dolomite, and so on.

(d) hexahedron crystal form halite, and so on.

(e) octahedron crystal form fluorite, and so on.

(f) dodecahedron crystal form: sphalerite, and so on.

Anything else, celadonite and glauconite are representative scales crystal forms.

In the present invention, the crystal systems of the functional minerals are specially regarded as well as these crystal forms.

Hereinafter, representative functional minerals of monoclinic crystal system are described.

monoclinic crystal system: acanthite, polybasite, jamesonite, boulangerite, realgar, orpiment, cryolite, manganite, azurite, malachite, hydrozincite, natron, borax, kernite, colemanite, glauberite, brochantite, monazite, lazulite, carnotite, chloritoid, chondrodite, sphene (titanite), datolite, gadolinite, uranophane, graphite, thortveitite, clinozoisite, epidote, allanite, pumpellyite, clinoenstatite, pigeonite, diopside, hedenbergite, augite, spodumene, jadeite, aegirine, aegirine augite, tremolite, actinolite, common hornblend, glaucophane, riebeckite, arfvedsonite, pyrophyllite, brucite, paragonite, muscovite, glauconite, celadonite, margarite, phlogopite, biotite, lepidolite, zinnwaldite, stilpnomelane, beidellite, montmorillonite, nontronite, saponite, vermiculite, penninite, clinochlore, prochlorite, chamosite, thuringite, antigorite, chrysotile, cronstedtite, halloysite, palygorskite, coesite, sanidine, orthoclase, scolecite, laumontite, heulandite, stilbite, phillipsite, armotome, clinoptiloloite, evenkite, and so on.

As the foregoing, a preferable characteristic of mineral to achieve the inventive object is that the crystal form is to be pinacoid, the crystal system is to be monoclinic. Further, these hardness is to be low.

As a result that, Phyllosilicates mineral is preferable to achieve the above conditions among various mineral kinds well known.

Phyllosilicates mineral
pyrophyllite$\{Al_2Si_4O_{10}(OH)_2\}$
talc$\{Mg_3Si_4O_{10}(OH)_2\}$
dioctahedral group
1. paragonite$\{NaAl_2(Al,Si_3)O_{10}(OH)_2\}$
2. muscovite$\{KAl_2(AlSi_3)O_{10}(OH,F)_2\}$
3. glauconite$\{(K,Na) (Al,Fe^{3+\alpha}Mg)_2(Al,Si)_4O_{10}(OH)_2\}$
4. celadonite$\{K(Mg,Fe)(Fe,Al)Si_4O_{10}(OH)_2\}$
5. Margarite$\{CaAl_2(Al_2Si_2)O_{10}(OH)_2\}$
6. micaschist
7. lepidomelane$\{KFeALSiO(OH,F)\}$ biotite group
1. phlogopite$\{KMg_3(AlSi_3)O_{10}(F,OH)\}$
2. lepidolite$\{K(Li,Al)_3(Si,Al)_4O_{10}(F,OH)_2\}$
3. zinnwaldite$\{KLiFe+2Al(Al,Si_3)O_{10}(F,OH)_2\}$
4. stipnomelane$\{K(Fe^{+2},Fe^{+3},Al)_{10}Si_{22}O_{30}(OH)_{12}\}$ montmorillonite group
1. beidellite$\{(Na,Ca/2)_{0.03}Al_2(Al,Si)_4O_{10}(OH)_2.nH_2O\}$
2. montmorillonite$\{(Na,Ca)_{0.33}(Al,Mg)_2Si_4O_{10}(OH)_2.nH_2O\}$
3. nontronite$\{Na_{0.33}Fe_2^{+3}(Al,Si)_4O_{10}(OH)_2.nH_2O\}$
4. saponite$\{(Ca/2,Na)_{0.33}(Mg,Fe)_3(Si,Al)_4O_{10}(OH)_2.4H_2O\}$
5. vermiculite$\{(Mg,Fe,Al)_3(Al,Si)_4O_{10}(OH)_2.4H_2O\}$ chlorite group
1. penninite
2. clinochlore$\{(Mg,Fe^{2+})_5Al(Si,Al)_4O_{10}(OH)_8\}$
3. prochlorite)=ripidolite$\{(Mg,Fe,Al)_6(Si,A)_4O_{10}(OH)_8\}$
4. chamosite$\{(Fe^{2+},Mg,Fe^{3+})_5Al(Si_3Al)O_{10}(OH,O)_8\}$
5. thuringite kaolinite-serpentine group
1. kaolinite$\{Al_2Si_2O_5(OH)_4\}$
2. antigorite$\{(Mg,Fe)_3Si_2O_5(OH)_4\}$
3. chrysotile$\{Mg_3Si_2O_5(OH)_4\}$
4. amesite$\{(Mg_2Al)(AlSi)O_5(OH)_4\}$
5. cronstedtite
6. halloysite$\{Al_2Si_2O_5(OH)_4.2H_2O\}(Al_2Si_2O_5(OH)_4$ by dewatering)
7. palygorskite=attapulgite$\{(Mg,Al)_2Si_4O_{10}(OH).4H_2O]$ In accordance with the first aspect of the present invention, the functional fiber is produced by mixing and synthesizing one kind or more than one kind of the above Phyllosilicates minerals and a chemical resin selected from a group consisting of polyester, polyamide, polypropylene, polyacrylonitrile, viscos rayon, and acetate rayon.

In addition, in accordance with the second aspect of the present invention, the functional fiber is produced by mixing and synthesizing a mixture and the chemical resins after making the mixture of one kind of the Phyllosilicates minerals and one kind of functional non-pinacoid crystal form minerals.

Figure 2:
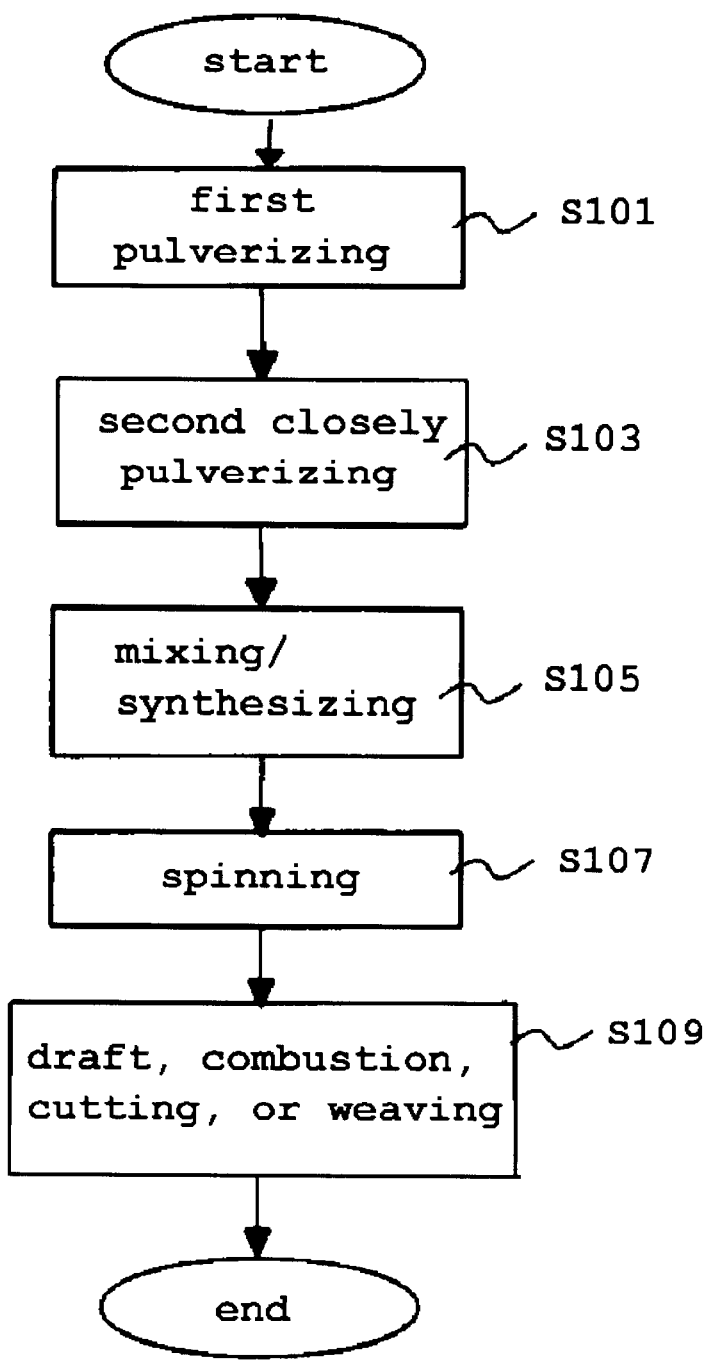
FIG. 2 is a flowchart showing a method of producing fiber having functional mineral powders according to the present invention.

FIG. 2 is a flowchart showing a method of producing fiber having functional mineral powders according to the present invention.

Referring to FIG. 2, a method of producing a fiber having functional mineral powders according to the first aspect of the present invention is proceeded as follows.

Firstly, the functional mineral which the crystal form is pinacoid is pulverized (step 101). Secondly, the first pulverized the functional mineral powders are closely pulverized in order to satisfy these fineness to be less than ⅓ granularity of desired fineness (step 103). Thirdly, 0.1–10 weight % of the second pulverized functional mineral powders are mixed and synthesized with 90–99.9 weight % of a chemical resin (step 105). Fourthly, the mixture of the functional mineral powders and the chemical resin is spun by a general spinning method or a double spinning method using double nozzles (step 107). Finally, the fiber having the functional mineral powders is produced through draft, combustion, cutting, or weaving (step 109).

The functional mineral is Phyllosilicates mineral preferably, in which these crystal system is monoclinic and hardness is low.

Figure 3:
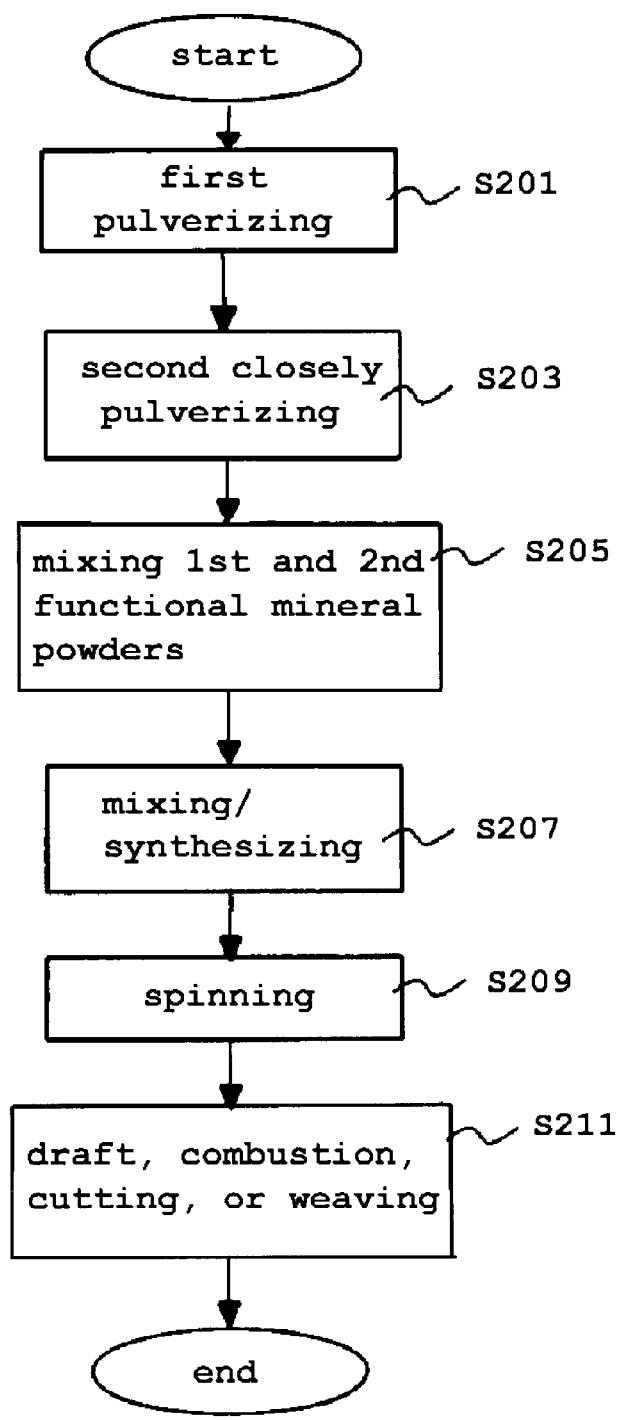
FIG. 3 is a flowchart showing another method of producing fiber having functional mineral powders according to the present invention.

FIG. 3 is a flowchart showing another method of producing a fiber having functional mineral powders according to the present invention.

Referring to FIG. 3, another method of producing a fiber having the many kinds functional mineral powders according to the second aspect of the present invention is proceeded as follows.

Firstly, the first functional mineral and the second functional mineral are pulverized, in which the crystal form of the first functional mineral powder is pinacoid and the crystal form of the second functional mineral powder is prism, pyramid, rhombohedron, hexahedron, octahedron, or dodecahedron (step 201).

Secondly, the first pulverized the first and second functional mineral powders are closely pulverized in order to satisfy these fineness to be less than 1/3 granularity of desired fineness (step 203). Thirdly, the second pulverized the first and second functional mineral powders are mixed (step 205). Fourthly, the mixed 0.1–10 weight % of the first and second functional mineral powders and 90–99.9 weight % of the chemical resin are mixed and synthesized (step 207). Fifthly, the mixture of the first and second functional mineral powders and the chemical resin is spun by the general spinning method or a double spinning method using double nozzles (step 209). Finally, the fiber having functional mineral powders is produced through draft, combustion, cutting, or weaving (step 211).

On the other hand, an inorganic antibiotic agent may be added in the methods according to the first and second aspects to increase the antibiosis. At this time, the inorganic antibiotic agent is fabricated by supporting 0.5–5 weight % of Ag ion to 95–99.5 weight % of zeolite, calcium phosphate, or zirconium. It is preferable that the mixing ratio of inorganic antibiotic agent is 3–30 weight %.

In addition, a firing process may be added in the above methods to remove an impurity in the mineral at 600–1,200 C, at this time the firing process is proceeded before the first pulverizing step or after the second closely pulverizing step.

Furthermore, the steps of removing metal elements by an electromagnet in state of mixing mineral powders with water, and passing mineral powder through a filter by a pressure may be further executed. Separately, a sedimentation method or a centrifuge method may be used to gain fine powders of the mineral.

In the above methods, the mixture ratio of the minerals is adapted to less than 3 denier fiber. In case of more than 3 denier fiber, the mixture ratio of the minerals have to be changed, at this time, the granularity of mineral powder have to be less than 1/3 of fineness and especially 3 micron of mineral powder is preferable in case of spinning less than 3 denier fiber more preferably less than 1 micron.

It is preferable that 0.1–3 weight % of the mineral powders are mixed with the chemical resin in case of less than 3 denier fiber, more preferably, 1.5–2.5 weight %, and 10 weight % of the mineral powders are mixed with the chemical resin in case of more than 3 denier fiber, more preferably, 2–6 weight %.

Figure 4:
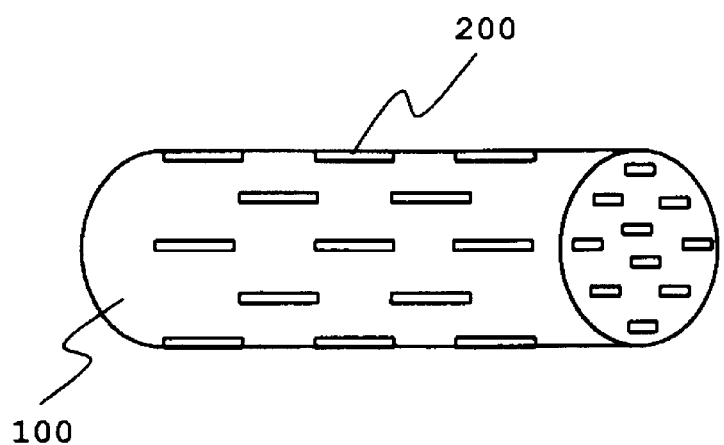
FIG. 4 is a side sectional view showing a fiber produced by the method corresponding to FIG. 2.
Figure 5:
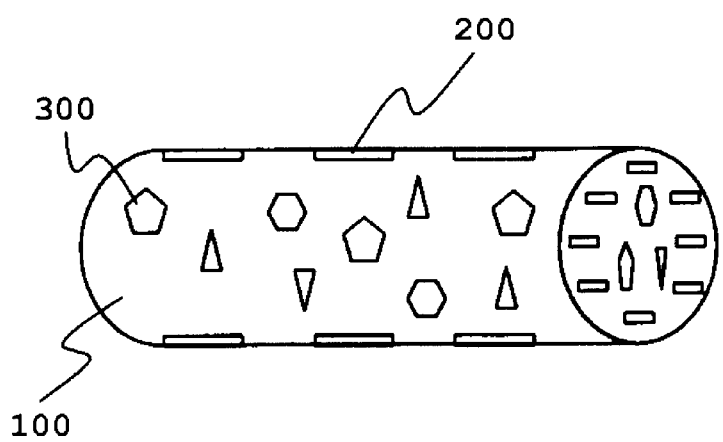
FIG. 5 is a side sectional view showing a fiber produced by the method corresponding to FIG. 3.

FIGS. 4 and 5 are side sectional views showing a fiber produced by the methods according to FIGS. 2 and 3.

Referring to FIG. 4, a fiber 100 have mineral powders (pinacoid) 200 arranged successively around surface in the fiber 100 thereby the fiber is pleasant to the touch and have a nature characteristic based on the mineral powders 200.

Referring to FIG. 5, the fiber 100 have the first mineral powders 200 arranged successively around surface in the fiber 100 and a second mineral powders 300 which the crystal form is prism, pyramid, rhombohedron, hexahedron, octahedron, or dodecahedron arranged irregularly at the inside of the fiber 100. Since the first mineral powders 100 surrounds the second mineral powders 300, the fiber is pleasant to the touch and have a nature characteristics based on the first and second mineral powders 200, 300 at the same time.

Hereinafter, various examples are described in detail, the present invention is not limited by the followings but various alterations are possible.

EXAMPLE 1

To produce a 2 denier filament radiating far infrared ray which is good to the human body and having a superior quality, a first pulverize muscovite which crystal form is pinacoid to be 325 mesh, and then a second closely pulverize muscovite powders so that the maximum granularity of muscovite powders becomes less than 1 micron after firing the first pulverized muscovite powders at 800 C. Thereafter, fine mineral powders are gained by the processes of removing metal elements by the electromagnet in state of mixing mineral powders with water, and passing mineral powder through a filter by a pressure.

Further, 17 weight % of muscovite powders and an inorganic antibiotic agent are mixed, and then the mixed powders are treated in a polymerization using polyester. Thereby 2 weight % of the fiber having the above mixed powder is produced by the general spinning process at 283 C±1 C. As a result that, wearing of fittings such as a heald, a roller, and a guide body and cutting of the fiber was not happened, and the fiber having a smooth surface and a superior quality was gained.

EXAMPLE 2

Except for using polyamide instead of polyester, this example is executed under same process as example 1.

EXAMPLE 3

After treating the mixed powders in the polymerization using polyester as example 1, chips having 2 weight % of mineral power are produced by batch polymerization process at 290 C of polymerization temperature and 2,700 poise of a coefficient of viscosity. Thereafter, 1.4 denier staple fiber is spun at 283 C±1 C of a spinning temperature. As result that, wearing of fittings and cutting of the fiber are not happened, and the fiber having a smooth surface and a superior quality was gained.

EXAMPLE 4

To produce a 1.4 denier acrylic staple fiber radiating far infrared ray which is good to the human body and cleaning stench, and having antibiosis, moisture absorption, a first pulverize elvan, which crystal form is not pinacoid and muscovite which crystal form is pinacoid, after firing process. And then second closely pulverize elvan and muscovite powders so that each maximum granularity of the powders is less than 1 micron. Thereafter, 22 weight % of elvan powders, 61 weight % of muscovite powders, and 17 weight % of zeolite powder inorganic antibiotic agent supporting 3 weight % of Ag ion are mixed. Finally, the mixed powders are synthesized with polyacrylonitrile and then the fiber having 2 weight % of the mixed powder is produced by general spinning process thereby wearing of fittings and cutting of the fiber were not happened, and the fiber having a smooth surface and a superior quality was gained.

EXAMPLE 5

Except for using viscos rayon instead of polyacrylonitrile, this example is executed under same process as example 4 so that the fiber having 2 weight % of the mixed powder is produced.

EXAMPLE 6

Except for using acetate instead of viscos rayon, this example is executed under same process as example 4 so that the fiber having 2 weight % of the mixed powder is produced.

EXAMPLE 7

To produce a 6 denier polyester staple fiber radiating far infrared ray and minus ion which are good to the human body, a first pulverize muscovite which the crystal form is pinacoid and tourmaline which the crystal form is non-pinacoid. And then second closely pulverize muscovite and tourmaline powders so that each maximum granularity of the powders is less than 5 micron. Thereafter, 70 weight % of muscovite powders, 15 weight % of tourmaline powders, and 15 weight % of zeolite powder inorganic antibiotic agent supporting 2 weight % of Ag ion are mixed. Further, 20 weight % of the mixed powders and 80 weight % of polyester are mixed and melted to fabricate a master batch chip. Finally, 25 weight % of the master batch chip and 75 weight % of polyester chip are synthesized so that the fiber having 2 weight % of the mixed powder is produced by general spinning process thereby wearing of fittings and cutting of the fiber were not happened, and the fiber having a smooth surface and a superior quality was gained.

In the above examples, natural funtional minerals are example but various artificial funtional minerals can be used according to the inventive spirit.

According to the present invention, by using only one kind of the functional mineral, especially phyllosilicates mineral, which the crystal form is pinacoid, or using many kinds of the functional minerals which the crystal forms are prism, pyramid, rhombohedron, hexahedron, octahedron, or dodecahedron mixed with the functional mineral which the crystal form is pinacoid thereby producing the fiber having a smooth surface due to particles of the phyllosilicates mineral powders distributed around surface in the fiber, and increasing the productivity because fittings of the equipments such as a heald, a roller, a guide body are not worn.

In addition, according to the present invention, by using the functional mineral, especially phyllosilicates mineral, thereby producing the fiber having a multifunction as far infrared ray radiating, blood pressure controlling, ache relief, antibiosis, stench cleaning, electron wave isolating, ultraviolet rays isolating, absorbent, moisture absorption, minus ion radiating, and static electricity preventing.

Other embodiments of the invention will be apparent to those skilled in the art from consideration of the specification and practice of the invention disclosed herein.

It is intended that the specification and examples be considered as exemplary only, with the true scope and spirit of the invention being indicated by the following claims and their equivalents.

What is claimed is:

1. A method of producing fiber having functional mineral powders, comprising the steps of:
   a first pulverizing a functional mineral of which the crystal form is pinacoid;
   a second closely pulverizing the first pulverized functional mineral powders to a particle size less than 1/3 of the desired thickness of the resultant fiber;
   mixing and synthesizing 0.1–10 weight % of the second pulverized the functional mineral powders and 90–99.9 weight % of a chemical resin; and
   spinning the mixture of the functional mineral powders and the chemical resin.

2. The method according to claim 1, wherein the functional mineral is natural or artificial functional minerals.

3. The method according to claim 1, wherein the functional mineral is phyllosilicates mineral.

4. The method according to claim 3, wherein the phyllosilicates mineral is selected from a group consisting of pyrophyllite, talc, paragonite, muscovite, glauconite, celadonite, Margarite, micaschist, lepidomelane, phiogopite, lepidolite, zinnwaldite, stipnomelane, beidellite, montmorillonite, nontronite, saponite, 5 vermiculite, penninite, clinochlore, prochlorite, chamosite, thuringite, kaolinite, antigorite, chrysotile, amesite, cronstedtite, halloysite, and palygorskite.

5. The method according to claim 1, further comprising the step of firing the functional mineral or the functional mineral powders at 600–1,200C.

6. The method according to claim 1, further comprising the step of mixing 3–30 weight % of an inorganic antibiotic agent.

7. The method according to claim 6, wherein the inorganic antibiotic agent is fabricated by supporting Ag ion to zeolite, calcium phosphate, or zirconium.

8. The method according to claim 1, further comprising the steps of:
   removing metal elements by an electromagnet in state of mixing the functional mineral powders with water; and
   passing the functional mineral powders through a filter by a pressure.

9. The method according to claim 1, wherein fine powders of the functional mineral is gained by a sedimentation method or a centrifuge method.

10. The method according to claim 1, wherein the chemical resin is selected from a group consisting of polyester, polyamide, polypropylene, polyacrylonitrile, viscose rayon, and acetate rayon.

11. The method according to claim 1, wherein the step of mixing and synthesizing comprises the steps of:
   mixing 10–30 weight % of the mineral powders and 70–90 weight % of the chemical resin selected from the group consisting of polyester, polyamide, or polypropylene;
   making a master batch chip by melting the mineral powders 20 and the chemical resin; and
   synthesizing the master batch chip with a basic material of the master batch chip.

12. The method according to claim 1, wherein the step of mixing and synthesizing comprises the step of mixing and polymerizing the mineral powders and the chemical resin selected from the group consisting of polyester, or polyamide.

13. The method according to claim 12, wherein a content of the mineral powders is 0.1–10 weight % and a content of the chemical resin excepting the mineral powders after polymerization is 90–99.9 weight %.

14. A method of producing fiber having functional mineral powders, comprising the steps of:
   a first pulverizing first and second functional minerals, in which the crystal form of the first functional mineral is pinacoid and the crystal form of the second functional mineral powder is selected from the group consisting of prism, pyramid, rhombohedron, hexahedron, octahedron, or dodecahedron;

a second closely pulverizing the first and second pulverized functional mineral powders to be less than ⅓ granularity of desired fineness;

mixing the first and second functional mineral powders;

mixing and synthesizing 0.1–10 weight % of the mixed first and second functional mineral powders and 90–99.9 weight % of a chemical resin; and spinning the mixture of the first and second functional mineral powders and the chemical resin.

15. The method according to claim 14, wherein the first and second functional minerals are natural or artificial functional minerals.

16. The method according to claim 14, wherein the first functional mineral is phyllosilicates mineral.

17. The method according to claim 16, wherein the phyllosilicates mineral is selected from a group consisting of pyrophyllite, talc, paragonite, muscovite, glauconite, celadonite, Margarite, micaschist, lepidomelane, phlogopite, lepidolite, zinnwaldite, stipnomelane, beidellite, montmorillonite, nontronite, saponite, vermiculite, penninite, clinochlore, prochlorite, chamosite, thuringite, kaolinite, antigorite, chrysotile, amesite, cronstedtite, halloysite, and palygorskite.

18. The method according to claim 14, further comprising the step of firing the first and second functional minerals or the first and second functional mineral powders at 600–1, 200C.

19. The method according to claim 14, further comprising the step of mixing 3–30 weight % of an inorganic antibiotic agent.

20. The method according to claim 19, wherein the inorganic antibiotic agent is fabricated by supporting Ag ion to zeolite, calcium phosphate, or zirconium.

21. The method according to claim 14, further comprising the steps of:

removing metal elements by an electromagnet in state of mixing the first and second functional mineral powders with water; and passing the first and second functional mineral powders through a filter by a pressure.

22. The method according to claim 14, wherein fine powders of the first and second functional mineral are gained by a sedimentation method or a centrifuge method.

23. The method according to claim 14, wherein the chemical resin is selected from a group consisting of polyester, polyamide, polypropylene, polyacrylonitrile, viscose rayon, and acetate rayon.

24. The method according to claim 14, wherein the step of mixing and synthesizing comprises the steps of:

mixing 10–30 weight % of the mixture of the first and second mineral powders and 70–90 weight % of the chemical resin selected from polyester, polyamide, or polypropylene;

making a master batch chip by melting the mineral powders and the chemical resin; and synthesizing the master batch chip with a basic material of the master batch chip.

25. The method according to claim 14, wherein the step of mixing and synthesizing comprises the step of mixing and polymerizing the mixture of the first and second mineral powders and the chemical resin selected from the group consisting of polyester, or polyamide.

26. The method according to claim 25, wherein a content of the mixture of the first and second mineral powders is 0.1–10 weight % and a content of the chemical resin excepting the mineral powders after polymerization is 90–99.9 weight %.

* * * * *